(12) United States Patent
Srinivas et al.

(10) Patent No.: US 10,502,137 B2
(45) Date of Patent: Dec. 10, 2019

(54) GAS TURBINE WITH A VALVE COOLING SYSTEM

(71) Applicant: General Electric Company, Schenectady, NY (US)

(72) Inventors: Avishetti Srinivas, Karnataka (IN); Laxmikant Merchant, Karnataka (IN); Anil Kumar Dasoji, Karnataka (IN); Ampili Kishore Kumar, Karnataka (IN)

(73) Assignee: General Electric Company, Schenectady, NY (US)

( * ) Notice: Subject to any disclaimer, the term of this patent is extended or adjusted under 35 U.S.C. 154(b) by 662 days.

(21) Appl. No.: 14/886,157

(22) Filed: Oct. 19, 2015

(65) Prior Publication Data

US 2017/0107907 A1 Apr. 20, 2017

(51) Int. Cl.
| | |
|---|---|
| *F02C 7/18* | (2006.01) |
| *F01D 25/24* | (2006.01) |
| *F01D 25/12* | (2006.01) |
| *F02C 6/08* | (2006.01) |
| *F16K 49/00* | (2006.01) |

(52) U.S. Cl.
CPC .............. *F02C 7/18* (2013.01); *F01D 25/12* (2013.01); *F01D 25/24* (2013.01); *F02C 6/08* (2013.01); *F16K 49/00* (2013.01)

(58) Field of Classification Search
CPC .......... F01D 25/08; F01D 25/12; F01D 25/24; F02C 7/18; F02C 6/08; F02C 9/18
See application file for complete search history.

(56) References Cited

U.S. PATENT DOCUMENTS

| | | | |
|---|---|---|---|
| 5,814,825 | A | 9/1998 | Mussman |
| 6,598,389 | B2 | 7/2003 | Chen et al. |
| 8,061,971 | B2 * | 11/2011 | Roush ..................... F01D 5/081 |
| | | | 415/108 |
| 2007/0089421 | A1 * | 4/2007 | Jangili .................... F01D 25/12 |
| | | | 60/772 |
| 2007/0125092 | A1 | 6/2007 | Wolfe et al. |
| 2009/0053046 | A1 | 2/2009 | Black et al. |
| 2009/0067988 | A1 | 3/2009 | S. Eluripati et al. |
| 2010/0034635 | A1 * | 2/2010 | Erickson ................. F01D 11/24 |
| | | | 415/1 |
| 2010/0096474 | A1 | 4/2010 | Zhang et al. |
| 2010/0135776 | A1 | 6/2010 | Chillar et al. |

(Continued)

FOREIGN PATENT DOCUMENTS

WO 2015/069125 A1 5/2015

OTHER PUBLICATIONS

Extended European Search Report and Opinion issued in connection with corresponding EP Application No. 16193633.1 dated Mar. 1, 2017.

*Primary Examiner* — Arun Goyal
(74) *Attorney, Agent, or Firm* — Eversheds Sutherland (US) LLP

(57) ABSTRACT

The present application provides a gas turbine engine. The gas turbine engine may include a compressor air extraction system with a number of valves, an exhaust frame cooling system with an exhaust frame blower, and a turbine valve cooling system with one or more valve protection boxes surrounding one or more of the valves. The valve protection boxes may be in communication with a flow of air from the exhaust frame blower.

20 Claims, 2 Drawing Sheets

(56) References Cited

U.S. PATENT DOCUMENTS

| | | |
|---|---|---|
| 2010/0170265 A1 | 7/2010 | Whaling et al. |
| 2013/0031910 A1 | 2/2013 | Merchant et al. |
| 2013/0247584 A1 | 9/2013 | Kasibhotla et al. |
| 2001/4004517 | 2/2014 | Saha et al. |
| 2014/0208765 A1 | 7/2014 | Ekanayake et al. |
| 2015/0082767 A1* | 3/2015 | Erickson ................ F01D 25/12 60/39.83 |
| 2015/0086338 A1 | 3/2015 | Aguilar |

* cited by examiner

GAS TURBINE WITH A VALVE COOLING SYSTEM

TECHNICAL FIELD

The present application and the resultant patent relate generally to gas turbine engines and more specifically relate to a turbine valve cooling system using exhaust frame blower air to cool turbine valves such as ejector valves, extraction flow modulation valves, and the like.

BACKGROUND OF THE INVENTION

A portion of the total airflow from the compressor may be extracted to cool various turbine components. The extracted air airflow, however, may not be used in the combustion process to produce useful work. Similarly, an ejector may use compressor bleed air extracted from different compressor stages at different pressures and temperatures to provide an immediate pressure and temperature airflow to the turbine. Depending upon local ambient conditions and other types of operational parameters, the ejector may be used or bypassed. The adequate management and control of these parasitic extraction flows therefore may increase the overall performance and efficiency of the gas turbine engine.

In addition to compressor flows, certain exhaust frame cooling systems use an external blower to provide cooling air to an exhaust frame manifold. Such a blower generally provides a cooling flow at a substantially constant rate. Although an external blower may be less "expensive" than compressor extraction flows, the use of the blower still has an impact on overall performance and efficiency.

Both the compressor extraction flows and the ejector use various types of valves to regulate the cooling flows. These valves, however, are generally positioned in high temperature locations about the compressor and the turbine. Such high temperature locations may cause loss of actuator seals, loss of actuator spring paint, and other types of damage. Valve damage and/or failure can have an impact on overall gas turbine performance and efficiency.

SUMMARY OF THE INVENTION

The present application and the resultant patent thus provide a gas turbine engine. The gas turbine engine may include a compressor air extraction system with a number of valves, an exhaust frame cooling system with an exhaust frame blower, and a turbine valve cooling system with one or more valve protection boxes surrounding one or more of the valves. The valve protection boxes may be in communication with a flow of air from the exhaust frame blower.

The present application and the resultant patent further provide a method of cooling one or more valves in a gas turbine engine. The method may include the steps of providing a flow of extraction air from a compressor to a turbine, controlling the flow of the extraction air by the one or more valves, positioning one of the valves in a valve protection box, and providing a flow of exhaust frame cooling air to the valve protection box from an exhaust frame blower.

The present application and the resultant patent further provide a gas turbine engine. The gas turbine engine may include a number of air extraction valves, an exhaust frame blower, and a valve protection box surrounding one of the air extraction valves. The valve protection box may be in communication with a flow of air from the exhaust frame blower.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
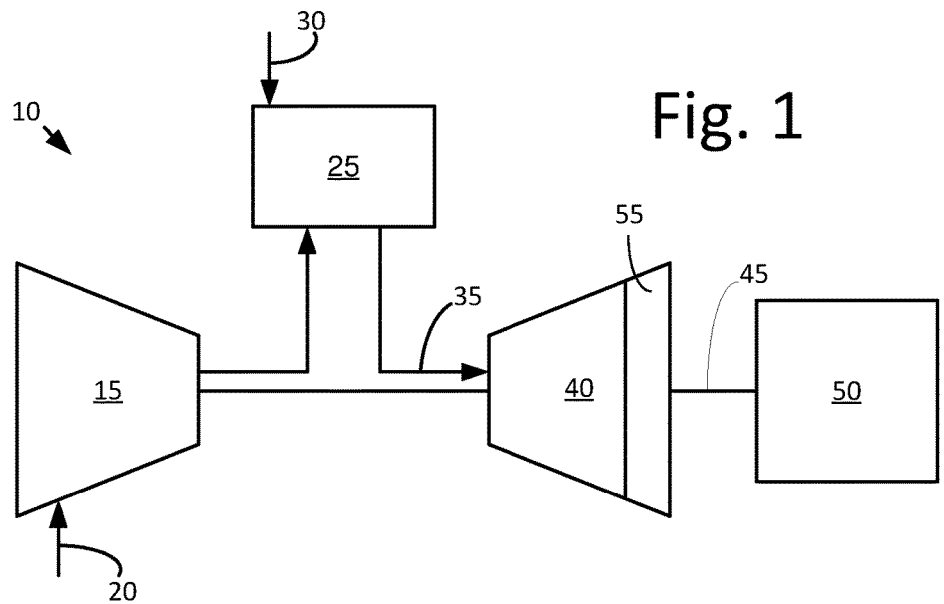
FIG. 1 is a schematic diagram of a gas turbine engine with a compressor, combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. The spent combustion gases 35 may be directed through an exhaust frame 55 and the like and put to further uses.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
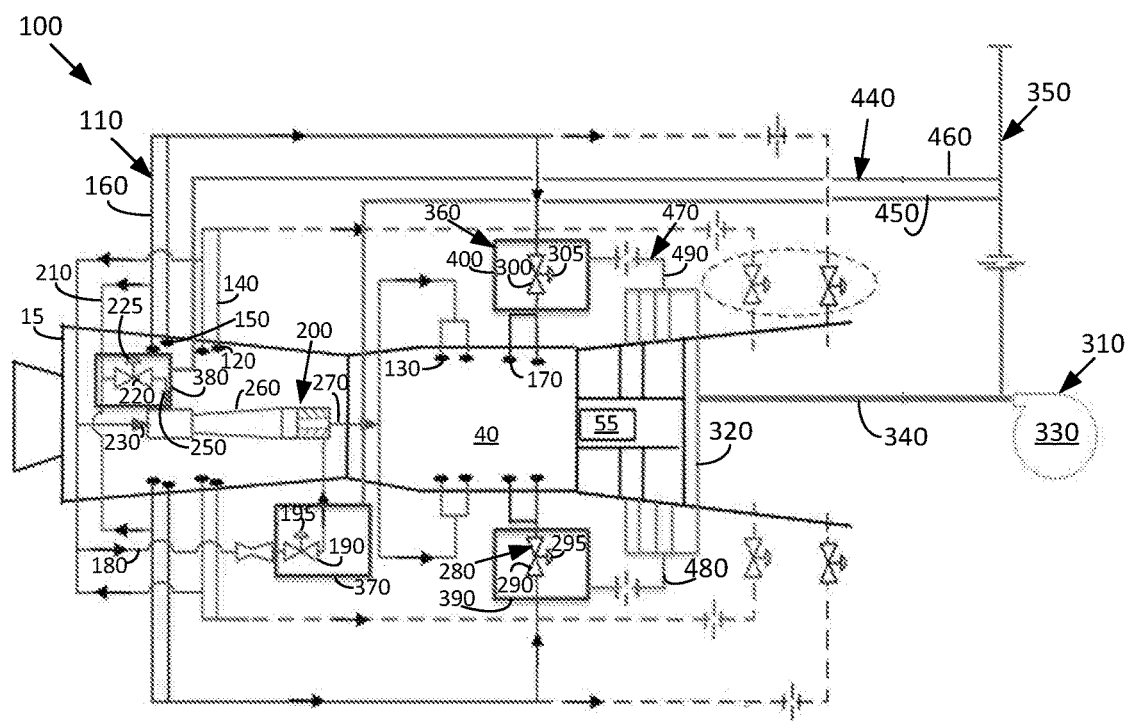
FIG. 2 is a schematic diagram of a gas turbine engine with a compressor extraction air system, an exhaust frame blower system, and a turbine valve cooling system as may be described herein.

FIG. 2 is a schematic diagram of an example of a gas turbine engine 100 as may be described herein. The gas turbine engine 100 may be similar to that described above, and may include similar components such as the compressor 15, the combustor 25, the turbine 40, the shaft 45, and the exhaust frame 55. Other components and other configurations also may be used herein.

The gas turbine engine 100 also may include a compressor air extraction system 110. The compressor air extraction system 110 may take a high pressure air extraction from, for example, a thirteenth stage 120 of the compressor 15 and provide the extracted air as a cooling airflow to, for example, a second stage 130 of the turbine 40 via a first flow path 140. Similarly, compressor air also may be extracted from an earlier stage, for example, a ninth stage 150 of the compressor 15 and supplied via a second flow path 160 as cooling air to, for example, a third stage 170 of the turbine 40. A bypass flow path 180 also may be in communication with the first flow path 140. The bypass flow path 180 may include a throttling or a bypass valve 190. The bypass valve 190 may include a bypass valve actuator 195. The bypass flow path 180 may provide additional airflow on cold days or due to other types of operational parameters. Other stages and other types of flow paths may be used herein.

An ejector 200 may be positioned on the first flow path 140. As described above, the ejector 200 enables mixing of the extracted air from the flow paths 140, 160 so as to adjust the extraction flows to optimize the efficiency of the overall gas turbine engine 100. The ejector 200 may be in communication with the second flow path 160 via a crossover flow path 210 positioned between the flow paths 140, 160. The crossover flow path 210 may include an isolation valve 220 thereon. The isolation valve 220 may include an isolation valve actuator 225. The isolation valve 220 may isolate the ejector 200 when ambient conditions or other types of operational parameters are not favorable. Other components and other configurations may be used herein.

Generally described, the ejector 200 is a mechanical device with no moving parts. Because the ejector 200 has no moving parts, the ejector is designed to operate at a specific design point based on ISO day conditions. The ejector 200 mixes two fluid streams based on a momentum transfer. The ejector 200 has a motive air inlet 230 for the high pressure motive fluid received via the first flow path 140, a primary nozzle to lower the static pressure for the motive flow to a pressure below the pressure of the suction pressure, a suction air inlet 250 for the lower pressure or suction fluid received via the crossover path 210, and a diffuser 260 for decelerating the mixed flow and regaining static pressure.

By locating the ejector 200 in the first flow path 140, the higher pressure extraction flow from the thirteenth stage 120 of the compressor 15 serves as a motive flow at the motive inlet 230 of the ejector 200. The lower pressure, lower temperature flow from the second flow path 160 flows to the ejector 200 via the crossover flow path 210 and serves as the suction flow via the suction inlet 250. Thus, the two flows are mixed together and flow through the diffuser 260. The two flows form a third flow 270 and exit at a pressure and temperature of the respective motive and suction flows. Other components and other configurations may be used herein.

The compressor extraction air system 110 also may include a number of extraction flow modulation valves 280. In this example, a first extraction flow modulation valve 290 and a second extraction flow modulation valve 300 are shown. The first extraction flow modulation valve 290 may include a first extraction flow modulation valve actuator 295 and the second extraction flow modulation valve 300 may include a second extraction flow modulation valve actuator 305. Any number of the extraction flow modulation valves 280 may be used herein. The extraction flow modulation valves 280 may be positioned on the first flow path 140, the second flow path 160, or otherwise. The extraction flow modulation valves 280 modulate the extent of the flow reaching the turbine 40 depending upon local ambient conditions and other types of operational parameters. Other components and other configurations also may be used herein.

The gas turbine engine 100 also may include an exhaust frame cooling system 310. The exhaust frame cooling system 310 may include an exhaust frame manifold 320 positioned about the exhaust frame 55. The exhaust frame cooling system 310 may include an exhaust frame blower 330. The exhaust frame blower 330 may be of conventional design and may have any suitable size or capacity. The exhaust frame blower 330 may be in communication with the exhaust frame manifold 320 via an exhaust frame blower line 340. The exhaust frame blower 330 thus provides cooling air to the exhaust frame 55 as needed. Other components and other configurations may be used herein.

Figure 3:
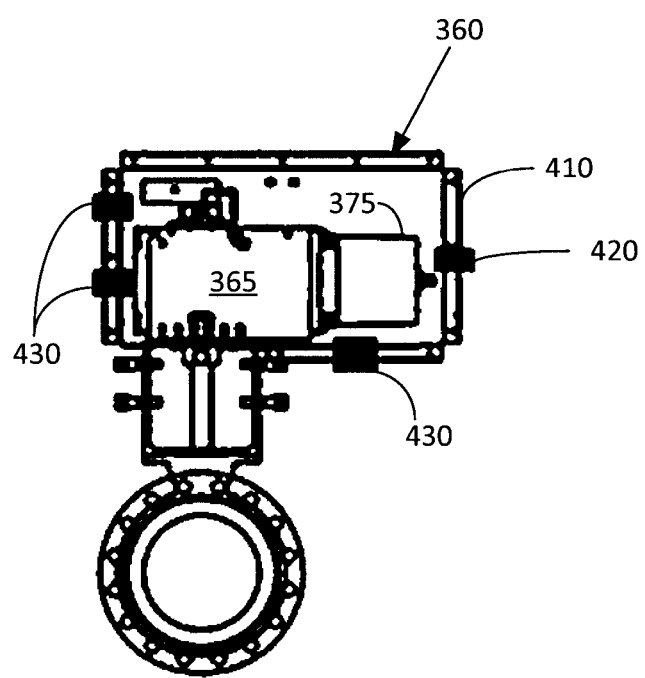
FIG. 3 is a schematic diagram of a valve protection box that may be used with the turbine valve cooling system of FIG. 2.

The gas turbine engine 110 also may include a turbine valve cooling system 350. The turbine valve cooling system 350 may include a number of valve protection boxes 360 as is shown in FIG. 3 for use with a valve 365 and an actuator 375. In this example, a bypass valve protection box 370, an isolation valve protection box 380, a first extraction flow modulation valve protection box 390, and a second extraction flow modulation valve protection box 400 are shown. Any number of the valve protection boxes 360 may be used herein with any of the valves 365 of the gas turbine engine 100 such as those described above or with other valves or other types of components. Each valve protection box 360 may surround the respective valves and actuators with an insulated heat shield 410. The insulated heat shield 410 may have any suitable size, shape, or configuration as well as any suitable type of amount of insulation therein. Each insulated heat shield 410 may include a cooling air inlet 420 and one or more cooling air outlets 430. The number of cooling air outlets 430 may vary. Other components and other configurations may be used herein.

The turbine valve cooling system 350 may include a number of ejector valve cooling lines 440. The ejector valve cooling lines 440 may T-off of the exhaust frame blower line 340 or other location in communication with the exhaust frame blower 330. In this example, an ejector bypass valve cooling line 450 and an ejector isolation valve cooling line 460 may be used. Any number of the ejector valve cooling lines 440 may be used herein. The ejector bypass valve cooling line 450 may be in communication with the bypass valve 190 in the bypass valve protection box 370. The ejector isolation valve cooling line 460 may be in communication with the isolation valve 220 in the isolation valve protection box 380. The ejector valve cooling lines 440 thus provide a flow of cooling air to the bypass valve protection box 370 and the isolation valve protection box 380 from the exhaust frame blower 330. The cooling air flows through the air inlets 420 of the valve protection boxes 360 and may be discharged via the cooling air outlets 430. Other components and other configurations may be used herein.

The gas turbine valve cooling system 350 may have a number of extraction flow modulation valve cooling lines 470. The extraction flow modulation valve cooling lines 470 may T-off of the exhaust fame manifold 320 or other location in communication with the exhaust frame blower 330. A first extraction flow modulation valve cooling line 480 may be in communication with the first extraction flow modulation valve 290 in the first extraction flow modulation valve protection box 390. A second extraction flow modulation valve cooling line 490 may be in communication with the second extraction flow modulation valve 300 in the second extraction flow modulation valve protection box 400. The extraction flow modulation valve cooling lines 470 thus provide a flow of cooling air to the extraction flow modulation valves 280 via the exhaust frame blower 330. The cooling air flows through the air inlets 420 of the valve protection boxes 360 and may be discharged via the cooling air outlets 430. Other components and other configurations may be used herein.

The turbine valve cooling system 350 thus provides a flow of cooling air to the various valves found in high temperature locations. The turbine valve cooling system 350 provides cooling air from the exhaust frame blower 330 to cool the various valves and actuators within the valve protection boxes 350 via convective heat transfer. Moreover, the valve protection boxes 360 include the insulated heat shield 410 so as to limit radiation heating from the hot environment. The turbine valve cooling system 350 thus maintains the various valves below maximum rated temperatures for an extended component lifetime. Moreover, the gas turbine valve cooling system 350 uses the cooling air from the exhaust blower 330 instead of the more expensive compressor extraction air and/or a further external system.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine, comprising:
   a compressor aft extraction system in communication with a compressor and a turbine;
   the compressor air extraction system comprising a first valve and a second valve, wherein the first valve and the second valve are in flow communication with the compressor and the turbine;
   the first valve and the second valve each comprising a valve body and a valve actuator;
   an exhaust frame cooling system;
   the exhaust frame cooling system comprising an exhaust frame blower; and
   a turbine valve cooling system;
   the turbine valve cooling system comprising a first valve protection box surrounding the first valve and a second valve protection box surrounding the second valve;
   wherein the first valve protection box comprises a first air inlet in communication with the exhaust frame blower and configured to receive a first flow of air from the exhaust frame blower; and
   wherein the second valve protection box comprises a second air inlet in communication with the exhaust frame blower and configured to receive a second flow of air from the exhaust frame blower.

2. The gas turbine engine of claim 1, wherein the compressor air extraction system further comprises a plurality of air extraction lines each extending from a stage of the compressor to a stage of the turbine.

3. The gas turbine engine of claim 2, wherein the first valve comprises a first extraction flow modulation valve positioned on a first air extraction line of the plurality of air extraction lines and configured to modulate a first extraction flow of air from the compressor to the turbine.

4. The gas turbine engine of claim 3, wherein the second valve comprises a second extraction flow modulation valve positioned on a second air extraction line of the plurality of air extraction lines and configured to modulate a second extraction flow of air from the compressor to the turbine.

5. The gas turbine engine of claim 4, wherein the first valve protection box comprises a first extraction flow modulation valve protection box surrounding the first extraction flow modulation valve, and wherein the second valve protection box comprises a second extraction modulation valve protection box surrounding the second extraction flow modulation valve.

6. The gas turbine engine of claim 5, wherein the exhaust frame cooling system comprises an exhaust frame manifold, and wherein the first extraction flow modulation valve protection box and the second extraction flow modulation valve protection box each are in fluid communication with the exhaust frame blower via the exhaust frame manifold.

7. The gas turbine engine of claim 2, wherein the compressor air extraction system further comprises an ejector in fluid communication with a first air extraction line of the plurality of air extraction lines and a second air extraction line of the plurality of air extraction lines.

8. The gas turbine engine of claim 7, wherein the first valve comprises a bypass valve.

9. The gas turbine engine of claim 8, wherein the bypass valve is positioned on a bypass line in fluid communication with the first air extraction line.

10. The gas turbine engine of claim 7, wherein the first valve protection box comprises a bypass valve protection box surrounding the bypass valve.

11. The gas turbine engine of claim 7, wherein the second valve comprises an isolation valve.

12. The gas turbine engine of claim 11, wherein the isolation valve is positioned on a crossover line extending between the first air extraction line and the second air extraction line.

13. The gas turbine engine of claim 11, wherein the second valve protection box comprises an isolation valve protection box surrounding the isolation valve.

14. The gas turbine engine of claim 1, wherein the first valve protection box and the second valve protection box each comprise an insulated heat shield.

15. A method of cooling a first valve and a second valve in a gas turbine engine, comprising:
    providing a flow of extraction air from a compressor to a turbine;
    controlling the flow of the extraction air by the first valve and the second valve, wherein the first valve and the second valve each comprise a valve body and a valve actuator;
    positioning the first valve in a first valve protection box, wherein the first valve protection box comprises a first air inlet in communication with an exhaust frame blower;
    positioning the second valve in a second valve protection box, wherein the second valve protection box comprises a second air inlet in communication with the exhaust frame blower;
    providing a first flow of exhaust frame cooling air from the exhaust frame blower to the first valve protection box via the first air inlet; and
    providing a second flow of exhaust frame cooling air from the exhaust frame blower to the second valve protection box via the second air inlet.

16. A gas turbine engine, comprising:
    a first air extraction valve comprising a first valve body and a first valve actuator;
    a second air extraction valve comprising a second valve body and a second valve actuator;
    wherein the first air extraction valve and the second air extraction valve are in flow communication with a compressor and a turbine;
    an exhaust frame blower;
    a first valve protection box surrounding the first air extraction valve, wherein the first valve protection box comprises a first air inlet in communication with the exhaust frame blower and configured to receive a first flow of air from the exhaust frame blower; and a second valve protection box surrounding the second air extraction valve, wherein the second valve protection box comprises a second aft inlet in communication with the exhaust frame blower and configured to receive a second flow of air from the exhaust frame blower.

17. The gas turbine engine of claim 16, wherein the first air extraction valve comprises a first extraction flow modulation valve, and wherein the second air extraction valve comprises a second extraction flow modulation valve.

18. The gas turbine engine of claim 16, wherein the first air extraction valve comprises a bypass valve in fluid communication with an ejector.

19. The gas turbine engine of claim 18, wherein the second air extraction valve comprises an isolation valve in fluid communication with the ejector.

20. The gas turbine engine of claim 16, wherein the first valve protection box and the second valve protection box each comprise an insulated heat shield.

* * * * *